No. 885,095. PATENTED APR. 21, 1908.
W. T. SOLOMON.
METHOD OF PRODUCING GAS FROM ALCOHOL.
APPLICATION FILED JAN. 30, 1907.
2 SHEETS—SHEET 1.
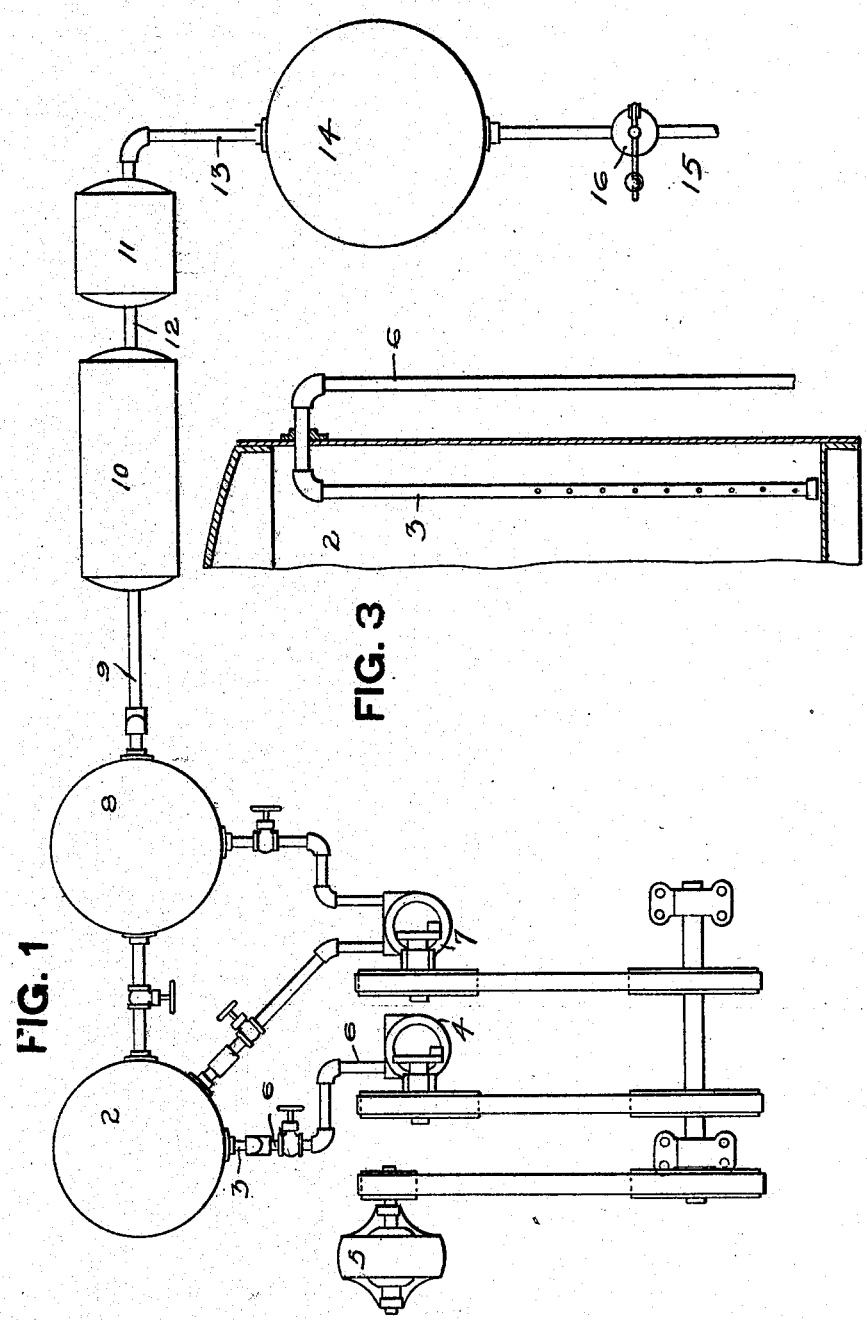
WITNESSES.
INVENTOR.

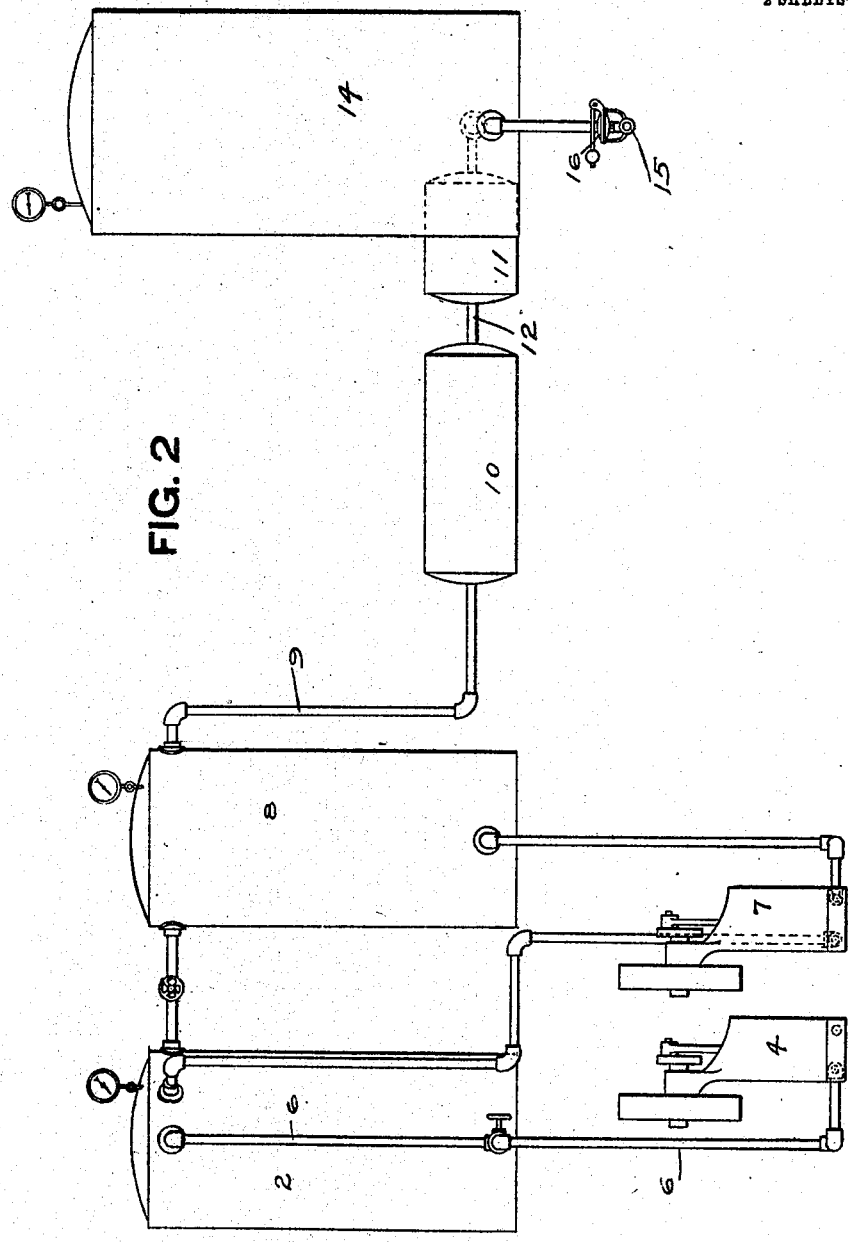

UNITED STATES PATENT OFFICE.

WILLIAM T. SOLOMON, OF PITTSBURG, PENNSYLVANIA, ASSIGNOR TO ROBERT C. HALL, OF PITTSBURG, PENNSYLVANIA.

METHOD OF PRODUCING GAS FROM ALCOHOL.

No. 885,095.  Specification of Letters Patent.  Patented April 21, 1908.

Application filed January 30, 1907. Serial No. 354,914.

*To all whom it may concern:*

Be it known that I, WILLIAM T. SOLOMON, of Pittsburg, in the county of Allegheny and State of Pennsylvania, have invented a certain new and useful Method of Producing Gas from Alcohol, of which the following is a full, clear, and exact description, reference being had to the accompanying drawings, in which—

Figure 1 is a plan view of apparatus employed by me; Fig. 2 is an elevation of the same, and Fig. 3 is a vertical sectional view of part of the alcohol tank.

My invention relates to the manufacture of gas from alcohol for illuminating and heating purposes and also for producing motive power and it consists broadly in oxidizing or dehydrating alcohol or alcoholic vapors as is hereinafter more fully described.

I will now describe my invention so that others skilled in the art may employ the same.

Although I do not desire to limit myself to the use of any apparatus I will describe my method for producing gas by the use of the apparatus shown in the drawing which is well adapted for this purpose.

In the drawing, 2 represents the alcohol tank having a capacity, say, of one hundred gallons and adapted to contain fifty gallons of alcohol during the operation of producing gas therefrom. In order to obtain even results and the best results I prefer to employ a governing feed device for feeding alcohol to this tank which shall at all times keep a fixed quantity of alcohol therein, that is, as the vapors are withdrawn from the tank and the quantity of alcohol is decreased, the regulator will open and permit the flow of alcohol to the tank until the fixed required amount is reached. Although I have not shown this apparatus in the drawings, the drawings being merely diagrammatic, any form of floating or pressure acting regulator may be employed. Within the tank 2 is the vertical agitator pipe 3 which consists of an air-pipe having perforations adapted to permit the passage of air under pressure into the alcohol in the tank 2 in such a manner that the alcohol shall be agitated, by the passage of the air, to aid in the vaporization of the alcohol contained in the tank. Situate adjacent to the tank 2 is an air force pump 4 arranged to be operated by the motor 5 and to force air through the pipe 6 to the agitator pipe 3.

Adjacent to the force pump 4 is an air suction pump 7 having an intake pipe leading from the top of the tank 2 and an outgoing pipe leading from the suction pump 7 to the vapor tank 8, which is adjacent to the tank 2 and which may be of any desired capacity. Leading from the top of the vapor tank 8 is a pipe 9 adapted to conduct the vapor to the horizontal chemical tank 10 at a point above the level of the chemicals which are contained therein. These chemicals, which form a liquid, which is the subject matter of a separate application, are of such a character as to oxidize the alcoholic vapors forming a fixed gas which is an ether. This gas passes from the chemical tank 10 to the drying chamber 11 by the pipe 12 where the gas is dried by the use of lime. The drying of the gas is not always a necessary step as ordinarily the gas is sufficiently dry to be used as it comes from the chemical chamber 10. Leading from the tank chamber 11 is a pipe 13 which passes to the gas reservoir 14 from which the gas passes to the main or service pipe 15 through a pressure regulator 16. The chemicals which I prefer to employ in the chamber 10 as an oxidizing agent are small quantities of sulfuric and nitric acid which have been first chemically combined with benzene, or one of the lighter hydrocarbons, and the product of which is then combined with about 90% of alcohol.

From the foregoing description, it will be clear that the alcohol, either methyl or ethyl, is first agitated in the presence of jets of air, producing vapor. This vapor is drawn from the alcohol tank by any suitable means and forced over or through a suitable oxidizing agent. The vapor is thus oxidized, forming gas which is carried to a storage tank or reservoir from which it can be drawn off and used as is desired. In some cases the reservoir may be omitted and the gas can be passed directly to the gas main or supply pipe. I have found that alcohol so treated, is changed into an ether forming a fixed gas capable of giving intense heat, a brilliant light and power for motive force, when burned or used in proper burners or mixers. This gas may be used singly or in connection with other forms of gas according to the use to which it may be put.

As heretofore it has been difficult to produce a fixed gas from alcohol in large quantities and as it has been impracticable to produce this gas for commercial purposes for lighting, heating, and motive power, the advantages of my invention will be appreciated by those skilled in the art, especially as a very small amount of oxidizing agent is, in my process, necessary to convert large quantities of alcohol into a fixed gas.

Although I have mentioned sulfuric acid, nitric acid, and benzene, combined with alcohol, as an oxidizing agent for the alcoholic vapors passing in contact with the same, I do not desire to limit myself to any one of these agents or to any other agent for oxidizing the alcohol vapor.

Suitable appliances may be employed to keep the alcohol from becoming too cool and the compound from becoming too hot during the operation of producing gas.

Having thus described my invention, what I claim and desire to secure by Letters Patent is:

1. The method of forming gas from alcohol consisting in mingling air and alcoholic vapor and then passing the mingled air and vapor over or through an oxidizing agent to produce an ether; substantially as specified.

2. The method of forming gas from alcohol, consisting in agitating alcohol in the presence of air to produce mingled air and alcoholic vapor, drawing off the mingled air and alcoholic vapor and then passing them over or through an oxidizing agent; substantially as specified.

3. The method of producing gas consisting in mingling air and alcoholic vapor and causing the mingled air and alcoholic vapor to pass over or through an oxidizing agent compounded of sulfuric acid, nitric acid, benzene, and alcohol, whereby a fixed gas is produced; substantially as specified.

4. The method of producing gas consisting in mingling air and alcoholic vapor, and causing the mingled air and alcoholic vapor to pass over or through an oxidizing agent compounded of nitric acid, benzene and alcohol, whereby a fixed gas is produced, substantially as specified.

In testimony whereof, I have hereunto set my hand.

WILLIAM T. SOLOMON.

Witnesses:
JAMES K. BAKEWELL,
C. E. EGGERS.